E. MAYNARD.
Carriage-Spring.
No. 23,102.
Patented Mar. 1, 1859.
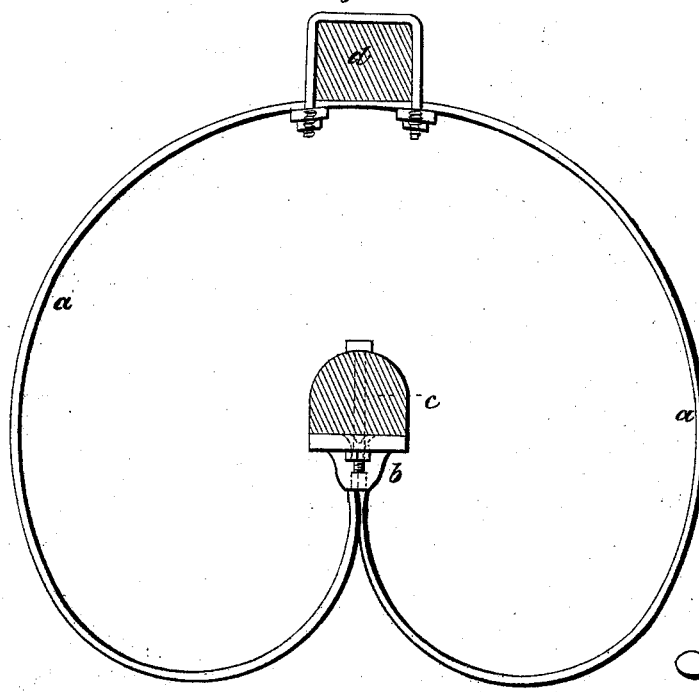
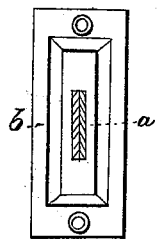
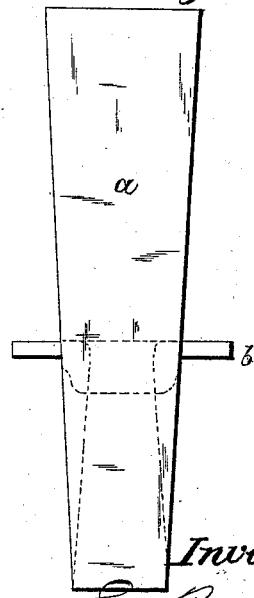
Witnesses
Lemuel W. Serrell
Thomas G. Harold
Inventor
E. Maynard

UNITED STATES PATENT OFFICE.

EDWARD MAYNARD, OF BROOKLYN, NEW YORK.

CARRIAGE-SPRING.

Specification of Letters Patent No. 23,102, dated March 1, 1859.

*To all whom it may concern:*

Be it known that I, EDWARD MAYNARD, of the city of Brooklyn, Kings county, and State of New York, have invented, made, and applied to use a certain new and useful Improvement in Springs for Carriages; and I do hereby declare that the following is a full, clear, and exact description of the construction and operation of the same, reference being had to the annexed drawing, making part of this specification, wherein—

Figure 1, is a side view of my spring; Fig. 2, is an end view of the same, and Fig. 3, is a plan of the shackle connecting the ends of the spring.

Similar marks of reference indicate the same parts.

In the construction of springs for carriages various forms have been devised, among others that of a double curve or heart-shape spring connected by movable or jointed shackles to the axles or bolsters. In this case the spring compresses considerably before the returned sides commence to touch each other. My said invention therefore does not consist in a returned or heart-shaped spring, but it does consist in the manner of attaching the ends of this returned or heart-shaped spring so that they are in contact with each other and the operation of a weight tends to draw said spring into a smaller compass, and the ends of said spring coiling or bearing against each other are brought into a straight form, thus obtaining a compound flexible action derived from bending a curved spring to a straight line and a larger curve to a smaller curve as the spring is strained under compression. By this method of constructing a spring, a very elastic or easy motion is obtained under a light weight, and an increasing power and rigidity as the weight is increased; and at the same time the spring is very simple in its construction, durable and cheap to manufacture.

In the drawing $a$, is the spring which is formed of steel tapering from the middle toward each end; these ends are bent around into a heart shape until they come into contact and then said ends are inserted while against each other into the shackle or block $b$, where they are secured by riveting up the end or by the introduction of a wedging plate or similar attachment to permanently connect said ends to the aforesaid shackle $b$.

$c$, is the axle, and $d$ represents the bolster or other part of the carriage, and the spring is to be attached to these parts by bolts and straps or otherwise in any convenient manner.

What I claim as new and desire to secure by Letters Patent is—

Attaching the returned ends of the spring directly to each other by means of the shackle $b$, substantially as and for the purpose specified.

In witness whereof I have hereunto set my signature this thirtieth day of November 1858.

E. MAYNARD.

Witnesses:
 LEMUEL W. SERRELL,
 THOMAS G. HAROLD.